A. H. BURNHAM.
Soldering Irons.
No. 138,732.
Patented May 13, 1873.
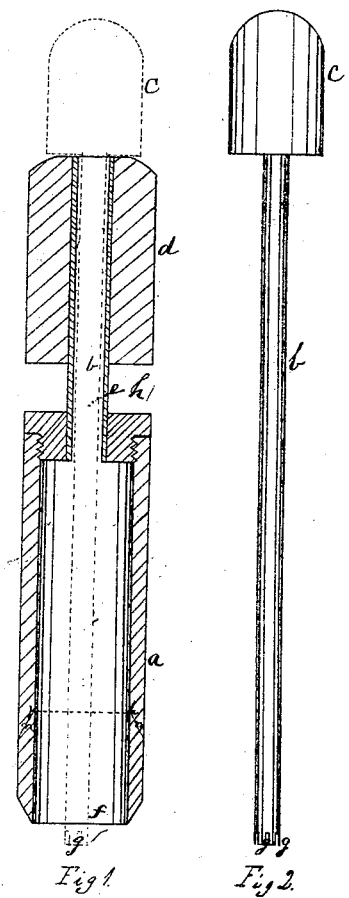
Witnesses:
Frank H. Jordan.
Edgar S. Brown
Inventor:
Albion H. Burnham
Per Wm Henry Clifford
Atty

UNITED STATES PATENT OFFICE.

ALBION H. BURNHAM, OF BRIDGETON, MAINE.

IMPROVEMENT IN SOLDERING-IRONS.

Specification forming part of Letters Patent No. 138,732, dated May 13, 1873; application filed November 1, 1872.

*To all whom it may concern:*

Be it known that I, ALBION H. BURNHAM, of Bridgeton, in the county of Cumberland and State of Maine, have invented certain new and useful Improvements in Soldering-Irons; and I do hereby declare that the following is a full, clear, and exact description thereof, that will enable others skilled in the art to which it appertains to make and use the same, reference being had to the accompanying drawing and to the letters of reference marked thereon which form a part of this specification.

Figure 1 is a side sectional elevation of my invention, the small rod or stud holder being indicated by pricked lines. Fig. 2 is a side view of the rod or stud holder.

Same letters show like parts.

The object of my invention is to produce a soldering-iron by the means of which the studs or small circular pieces of tin to be fitted in the tops of cans may be so firmly soldered as to exclude the possibility of the entrance of any air after the operation is performed, and at the same time to insure the preservation of the article inclosed and to perform the operation with greater speed and economy of solder than by using any of the various devices now employed.

The operation of my invention is as follows: The circular stud, having first been over the cavity in the top of the can, a strip of solder is then laid around its edge in a small groove prepared for the purpose. My soldering-iron $a$ is then heated to the proper temperature, and, containing the rod or stud holder $b$, is placed over the stud in such manner that the lower end of the rod shall be over the minute puncture in the stud. The soldering-iron is then allowed to drop upon the ring of solder and is held in place by grasping the handle $c$ of the rod or stud holder, and then, by rotating the iron once or twice by means of the non-conducting handle $d$, the solder is sufficiently melted to become fixed in its place. The heat from the iron rarefies the air inside the can, which escapes through the minute puncture in the stud into the concave end of the rod or stud holder, and from thence through the lateral slots $g$ $g$ into the larger cavity $f$ in the soldering-iron.

My soldering-iron is made with copper tipped with tin, and as long as it is a little concave at the bottom it may be either solid or cylindrical above.

I am aware of devices where the soldering-iron is made attached to an arm and capable of being carried around a rod, which is screwed into the top of the stud; but I do not claim such an arrangement. My device embraces the rod or stud holder $b$ having the handle $c$, said rod passing through the non-conducting handle $d$ of the soldering-iron, through the short sleeve $e$, and then through the exact center of the soldering-iron. The lower end of the rod or stud holder will always rest upon a point, which is the center of the circle described by the cylindrical soldering-iron.

An economical and convenient modification of my invention may consist of a solid piece of metal in place of the cylindrical copper soldering-tool with the lower part thereof removable. This would make a ring of metal at the bottom of the iron, fitting on over the same a little way. A short distance up the iron, on the outside, a shoulder could be made for the ring to fit against. Both edges of the ring could be sharpened or tapered for soldering, so that when one edge was worn out the ring could be reversed and the other edge used. The horizontal pricked lines, Fig. 1, show the shoulder. The inclined lines $n$ with the bevel $p$ show the form of the ring. In such case the cylinder $a$ can be made of any metal and solid or hollow.

I do not claim the devices set forth in N. G. Numsen's patent, June 11, 1872, 127,914—viz., the combination of a tube, cap, and holder—as therein described. Neither do I claim the subject of Letters Patent to L. McMurray and R. J. Hollingsworth, April 23, 1872, No. 126,071, which is for a cap pressing-block of soapstone with air-passages; the combination of the cap pressing-block with a spring-rod passing through a hollow stem and handle of the soldering-block; and a combination of the internal and external stems and intermediate spring. Neither do I claim a tool for soldering caps on cans, in which the soldering-block is thickened at its base around the soldering-tip, or flanged and formed on its bottom with a surface conforming to the top of the can. My invention consists of a rod, $b$, having a a handle, *c*, and the small spaces *g*. This rod passes through the handle *a* and sleeve *e*. The handle *d*, sleeve *e*, and iron which performs the soldering operation, are all connected and revolve together when the handle *d* is turned. The rod *b* is removed when the iron is being heated, and one rod will serve for as many irons as one operator uses. Moreover, my invention shows a reversible tip or end, which much increases the durability of the tool.

Having thus described my invention, what I claim as new, and desire to secure by Letters Patent, is—

1. A soldering-iron, composed of the rod *b* with its handle *c*, handle *d*, sleeve *e*, space *h*, and hollow iron *a*, to operate as herein set forth.

2. A soldering-iron, composed of the rod *b* with its handle, the handle *d*, sleeve *e*, and space *h*, together with the iron *a* having the reversible tip, as herein described.

In testimony that I claim the foregoing I have hereunto set my hand this 16th day of October, 1872.

A. H. BURNHAM.

Witnesses:
 WM. H. CLIFFORD,
 FRANK H. JORDAN.